(12) United States Patent
Murphy, III et al.

(10) Patent No.: US 7,461,031 B2
(45) Date of Patent: Dec. 2, 2008

(54) SYSTEM AND METHOD FOR METER ENABLED PAYMENT FUNCTIONALITY

(75) Inventors: Charles F. Murphy, III, Milford, CT (US); Laura A. Hill, Woodbridge, CT (US)

(73) Assignee: Pitney Bowes Inc., Stamford, CT (US)

( * ) Notice: Subject to any disclaimer, the term of this patent is extended or adjusted under 35 U.S.C. 154(b) by 716 days.

(21) Appl. No.: 10/930,366

(22) Filed: Aug. 31, 2004

(65) Prior Publication Data

US 2006/0047609 A1 Mar. 2, 2006

(51) Int. Cl.
G06F 17/00 (2006.01)
G07B 17/02 (2006.01)
G06G 7/00 (2006.01)

(52) U.S. Cl. .................. 705/401; 705/400; 705/408

(58) Field of Classification Search ......... 705/400–401, 705/408
See application file for complete search history.

(56) References Cited

U.S. PATENT DOCUMENTS

| | | | |
|---|---|---|---|
| 4,802,218 A | 1/1989 | Wright et al. ................. 380/23 |
| 4,864,618 A | 9/1989 | Wright et al. ................. 380/51 |
| 4,900,903 A | 2/1990 | Wright et al. ............... 235/380 |
| 4,900,904 A | 2/1990 | Wright et al. ............... 235/381 |
| 5,280,531 A | 1/1994 | Hunter ......................... 382/1 |
| 5,319,562 A | 6/1994 | Whitehouse | |
| 5,625,694 A | 4/1997 | Lee et al. ...................... 380/23 |
| 5,666,284 A | 9/1997 | Kara .......................... 705/402 |
| 5,717,597 A | 2/1998 | Kara ....................... 364/464.18 |
| 5,731,980 A | 3/1998 | Dolan et al. ............ 364/464.2 |
| 5,742,683 A | 4/1998 | Lee et al. ...................... 380/23 |
| 5,778,076 A | 7/1998 | Kara et al. .................... 380/51 |
| 5,778,347 A | 7/1998 | Hetzer ......................... 705/408 |
| 5,781,438 A | 7/1998 | Lee et al. ............... 364/464.14 |
| 5,793,867 A | 8/1998 | Cordery et al. ................. 380/4 |
| 5,796,834 A | 8/1998 | Whitney et al. ............... 380/25 |

(Continued)

FOREIGN PATENT DOCUMENTS

EP 690417 A2 * 1/1996

OTHER PUBLICATIONS

"How to Choose a Postage Machine That's Right for Your Business", Aug. 1987, Profit Building Strategies For Business Owners, p. 21-22.*

Primary Examiner—John W Hayes
Assistant Examiner—Fadey S Jabr
(74) Attorney, Agent, or Firm—George M. Macdonald; Angelo N. Chaclas

(57) ABSTRACT

A method of collecting a payment from a postage meter customer having a past due account including receiving a service request from the postage meter, requesting that the customer provide credit card information through the postage meter for purposes of charging the payment, and performing the service if the customer provides the credit card information, and denying the service if the customer does not provide the credit card information. Also, a method of updating payment method information for a customer including receiving a request from the postage meter for a postage refill to be charged to default credit card, attempting to charge payment for the refill to default credit card and determined that the charge has been rejected, receiving new credit card information from the postage meter and thereafter providing the postage refill and storing the new credit card information for use in the future trasactions.

20 Claims, 2 Drawing Sheets

U.S. PATENT DOCUMENTS

| | | | |
|---|---|---|---|
| 5,801,944 A | 9/1998 | Kara | 364/464.2 |
| 5,812,400 A | 9/1998 | Eddy et al. | 364/464.2 |
| 5,812,991 A | 9/1998 | Kara | 705/410 |
| 5,819,240 A | 10/1998 | Kara | 705/408 |
| 5,825,893 A | 10/1998 | Kara | 380/51 |
| 5,826,246 A * | 10/1998 | Bator et al. | 705/403 |
| 5,835,604 A | 11/1998 | Lee | 380/51 |
| 5,835,689 A | 11/1998 | Braun et al. | 395/113 |
| 5,880,448 A | 3/1999 | Hetzer et al. | 235/383 |
| 5,884,292 A | 3/1999 | Baker et al. | |
| 5,909,373 A | 6/1999 | Sansone et al. | 364/479.08 |
| 5,987,441 A | 11/1999 | Lee et al. | 705/401 |
| 6,044,364 A | 3/2000 | DeFilippo et al. | 705/404 |
| 6,050,486 A | 4/2000 | French et al. | 235/101 |
| 6,061,671 A | 5/2000 | Baker et al. | 705/404 |
| 6,151,590 A | 11/2000 | Cordery et al. | 705/60 |
| 6,157,919 A | 12/2000 | Cordery et al. | 705/60 |
| 6,208,980 B1 | 3/2001 | Kara | 705/408 |
| 6,227,445 B1 | 5/2001 | Brookner | 235/379 |
| 6,233,565 B1 | 5/2001 | Lewis et al. | |
| 6,233,568 B1 | 5/2001 | Kara | 705/410 |
| 6,260,028 B1 | 7/2001 | Lee et al. | 705/401 |
| 6,285,900 B1 | 9/2001 | Stuber et al. | 800/410 |
| 6,285,990 B1 | 9/2001 | Lee et al. | 705/60 |
| 2002/0016780 A1* | 2/2002 | Shah | 705/410 |
| 2004/0118915 A1* | 6/2004 | Daniel et al. | 235/382.5 |

* cited by examiner

SYSTEM AND METHOD FOR METER ENABLED PAYMENT FUNCTIONALITY

FIELD OF THE INVENTION

The present invention relates to a system and method for enabling and facilitating postage related payments using a postage meter, and in particular to a system and method for making payments on past due accounts using a postage meter and a credit card and for updating payment method information using a postage meter.

BACKGROUND OF THE INVENTION

Postage metering systems are well known in the art. A typical postage meter applies evidence of postage, commonly referred to as a postal indicia, to an envelope or other mailpiece and accounts for the value of the postage dispensed. As is well known, postage meters include an ascending register, that stores a running total of all postage dispensed by the meter, and a descending register, that holds the remaining amount of postage credited to the meter. The value of the descending register is reduced by the amount of postage dispensed during a transaction. Postage meters generally also include a control sum register which provides a check upon the descending and ascending registers by keeping a running total of all finds that have been added into the meter.

United States postal regulations do not allow postage meters to be owned by the customer that uses the meter, such as an individual or a business. Instead, for security and control purposes, ownership of postage meters must be retained by the meter manufacturer. As a result, postage meters are rented rather than sold by meter manufacturers to customers for a periodic rental fee. Such manufacturers may also rent ancillary or related products, such as a scale, to the customers in conjunction with the meters. Customers are typically billed periodically, such as quarterly, for the rental fees associated with the postage meters and ancillary or related products they have rented. For various reasons, customers often fall behind on their rental fee payment obligations, resulting in past due accounts that are often difficult, inconvenient and/or time consuming to collect upon. Thus, there is a need for a system and method for automating and facilitating the collection of payments for past due rental accounts.

Furthermore, because postage meters hold a finite amount of postage value that is used up over time, they must be periodically refilled or recharged with postal value. Traditionally, in order for a customer to refill or recharge a postage meter, the customer had to physically bring the postage meter to a post office, where it would be manually opened, inspected, refilled, and resealed by an authorized postal employee. More recently, automated systems for remotely (at the owner's location) refilling and inspecting postage meters have been developed and are in widespread use. In one such system, meters are refilled using the telephone system wherein meter related information is communicated by a customer to a remote data center and recharging information is communicated by the data center to the customer using the telephone lines. In another remote recharging system, the postage meter itself communicates electronically, such as with a modem or the like, with a remote data center computer in order to exchange the information required to recharge the meter. In any such remote recharging system, the customer must pay for the postage value before it is loaded into the customer's postage meter. In many instances, customers utilize a credit card for this purpose, and a record of the customer's credit card information is maintained by the provider that operates the remote data center for purposes of charging payments for postage refills. Often times, credit card related problems arise during the recharging process that prevent a customer from recharging their meter. For example, the credit card on file with the provider, which the provider treats as the default method of payment used in the recharging system, may have expired, reached a credit limit or have been suspended due to a lost or stolen card. In such situations, the customer must contact the provider directly, typically by telephone, to provide information for a new credit card to be used for the current transaction and as the future default method of payment. This step is inconvenient and time and resource consuming for both the user and the provider, which must employ staff to receive and act upon such calls. Thus, there is a need for a system for automating and facilitating the updating of credit card information for postage meter customers.

SUMMARY OF THE INVENTION

The present invention relates to a method of collecting a payment from a customer associated with a postage meter where the customer has a past due account for, for example, rental of the postage meter. The method includes receiving a request for a service from the postage meter and determining that the customer has the past due account. The method also includes requesting through the postage meter that the customer make the payment for the past due account using a credit card, requesting that the customer provide credit card information through the postage meter relating to the credit card for purposes of charging the payment to the credit card, and performing the service and charging the payment to the credit card if the customer provides the credit card information, and denying the service if the customer does not provide the credit card information. The service may include a postage refill for the postage meter or a remote inspection for the postage meter, among other things. Preferably, the method is performed at a data center of a provider of the postage meter that is located remotely from the postage meter. The payment that is charged to the credit card may include payment in full for the past due account, or some fraction of the past due account as determined by the provider.

The present invention also relates to a method of updating payment method information for a customer associated with a postage meter wherein the customer has previously provided a default credit card for payment for postage refills. The method includes receiving a request from the postage meter for a postage refill for the postage meter, wherein the postage refill is to be charged to the default credit card, and attempting to charge the payment for the postage refill to the default credit card and determining that the charge has been rejected. The method also includes receiving new credit card information from the postage meter, thereafter providing the postage refill to the postage meter and storing the new credit card information for use in future transactions. The new credit card information that is provided using the postage meter may include credit card information for a new credit card or, alternatively, updated credit card information for the default credit card, such as a new expiration date. Preferably, the postage refill is only provided if the payment is successfully charged using the new credit card information provided by the customer.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
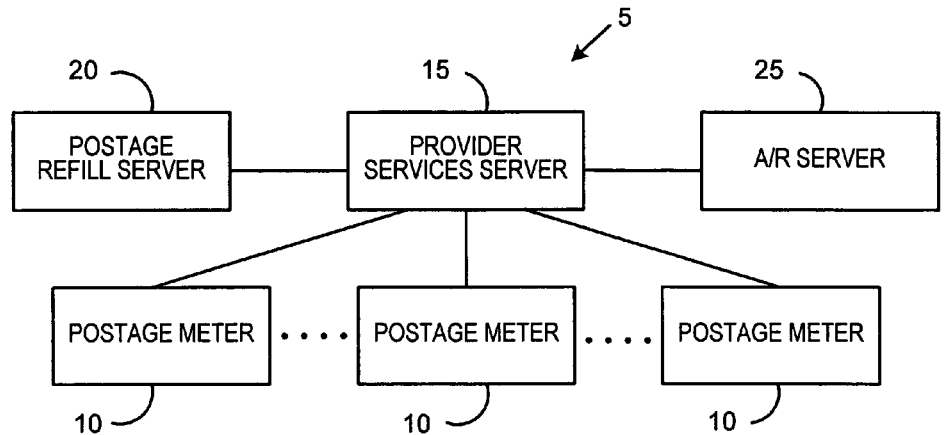
FIG. 1 is a block diagram of a system for making payments on past due accounts and updating payment information according to the present invention.

FIG. 1 is a block diagram of a system 5 for making payments on past due accounts and updating payment method information according to the present invention. System 5 includes a plurality of postage meters 10. Each postage meter 10 is rented by a customer from a provider and is used by the customer at a customer location. Each postage meter 10 is in electronic communication, such as through a modem or the Internet, with provider services server 15. Provider services server 15 comprises a server computer located at a location remote from each postage meter 10 that is operated by or under the direction of the postage meter provider. Provider services server 15 is the main communications interface between the provider and postage meters 10, and handles requests for various services from each postage meter 10, including, without limitation, requests for refilling postage and requests for remote meter inspection.

Provider services server 15 is in electronic communication with postage refill server 20, which is a server computer that includes a software system for tracking, managing and administering postage value refills for remotely located postage meters such as postage meters 10. As described above, such remote postage value refilling systems are well known in the art and thus will not be described in detail herein. In addition, provider services computer 15 is in electronic communication with accounts receivable server 25, which is a server computer that includes a system for tracking and managing customer accounts. A number of such systems are known in the art and are able to track the status of customer accounts, such as amounts due and/or past due for rental fees owed for postage meters 10 and any other products rented by the customer (referred to as accounts receivable data). Provider services server 15 is thus able to access and receive accounts receivable data from accounts receivable server 25 for any particular customer having a postage meter 10. In addition, through communications with postage refill server 20, provider services server 15 is able to fulfill postage value refill requests for any particular postage meter 10.

Figure 2:
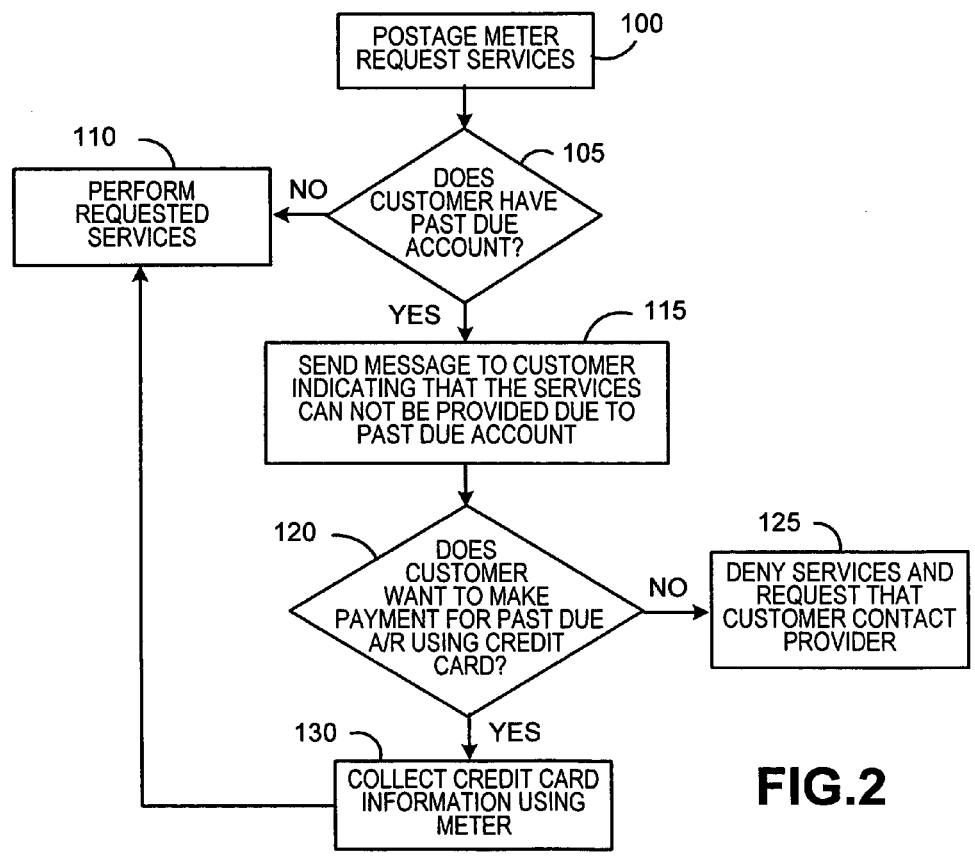
FIG. 2 is a flowchart of a method for making payments on past due accounts using a postage meter and a credit card according to an aspect of the present invention.

FIG. 2 is a flowchart depicting a method for making payments on past due customer accounts using the system shown in FIG. 1 according to an aspect of the present invention. As seen at step 100, the method begins with one of the postage meters 10 sending a message to provider services server 15 requesting a service such as a postage value refill or a remote inspection. Next, at step 105, a determination is made as to whether the customer associated with the postage meter 10 has a past due account. In particular, product services server 15 queries accounts receivable server 25 to obtain account information for the customer and determines whether the customer has a past due account. As will be appreciated, what exactly constitutes a past due account in each situation will be determined by the provider. For example, an account may be considered to be past due a predetermined number of days, such as thirty, following the issuance of an invoice.

If the customer does not have a past due account, then, at step 110, provider services server 15 facilitates the performance of the requested service. For example, if the requested service is a postage value refill, provider services server 15 communicates with postage refill server 20 and the postage meter 10 in order to fulfill the postage refill request according to the provider's established procedure. If, however, the customer does have a past due account, then, at step 115, provider services server 15 sends a message to postage meter 10 indicating that the requested services cannot be performed because the customer has a past due account. Postage meter 10 includes a display, such as an LCD, that will present such a message to the customer for viewing. Next, a determination is made as to whether the customer wants to make a payment for the past due account using postage meter 10 and a credit card. In particular, an appropriate message will be displayed to the customer, and the customer is able to make a choice by entering information using the keyboard or other input device provided on the postage meter 10 which is then transmitted to provider services server 15. If the answer at step 120 as reflected by the received information is no, then, at step 125, the requested services are denied and an appropriate message is transmitted to the postage meter 10 and displayed to the customer. Preferably, the message includes a request for the customer to contact the provider to discuss the past due account. If, however, the answer at step 120 is yes, then, at step 130, credit card information, including a card number and expiration date, is collected from the customer for purposes of making a payment for the past due account. Specifically, the customer enters this information into the postage meter 10, which then transmits it to provider services server 15. Alternatively, the customer may provide an indication that a credit card on file with the provider may be used for this purpose. Next, the method returns to step 110 where the requested service, such as a postage value refill, is performed. Note that the provider may decide what level of payment will be required to proceed to step 110 at this point. For example, the provider may require that the total past due amount be paid in full, or, alternatively, that only a percentage of the past due amount be paid.

Thus, this aspect of the invention provides an automated system and method for collecting payments on past due accounts that provides added convenience to both the customer and the provider. As a result, customers are able to get services in an immediate fashion, rather than having to wait to resolve a past due account by calling the provider, and providers are able to collect on past due accounts with less burden on their staffs.

Figure 3:
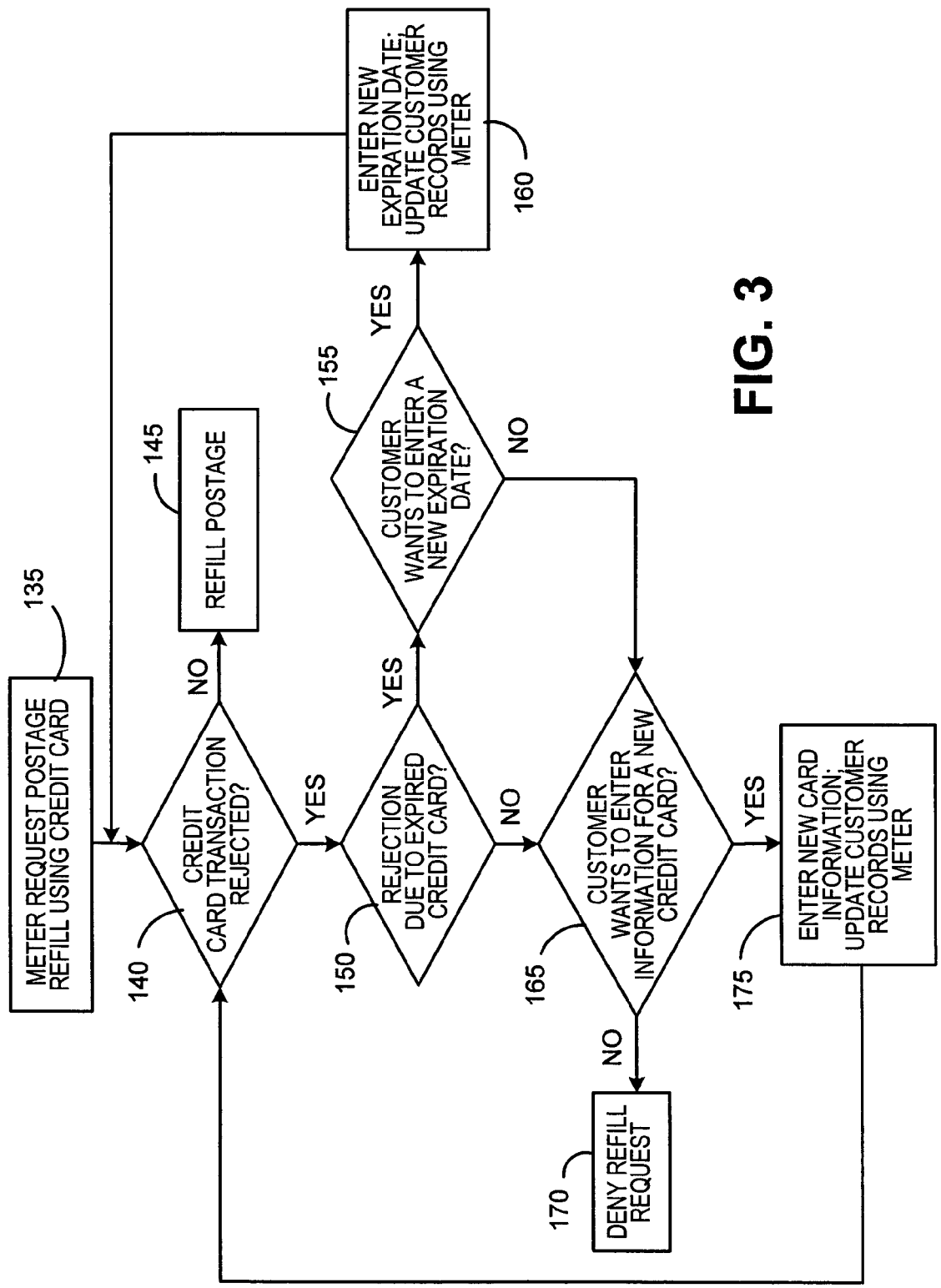
FIG. 3 is a flowchart of a method for updating payment method information using a postage meter according to an aspect of the present invention.

FIG. 3 is a flowchart depicting a method for updating payment method information according to a further aspect of the present invention. The method begins at step 135, where a postage meter 10 sends a request to refill or recharge postage meter 10 to provider services server 15 in which the customer wishes to pay for the postage refill using a credit card. In this situation, the provider has previously received and stored information for the particular credit card that the customer wishes to use as its default method of payment. This information, which includes the credit card number and expiration date is accessed by provider services server 15. Next, provider services server 15 attempts to make the appropriate charge to the customer's credit card, and, at step 140, a determination is made as to whether the attempted credit card transaction has been rejected by the issuer of the credit card. If the answer is no, then, at step 145, provider services server 15 communicates with postage refill server 20 and the postage meter 10 in order to fulfill the postage refill request according to the provider's established procedure. If, however, the answer at step 140 is no, meaning the credit card transaction has been rejected, then, at step 150, the provider services server 15 determines whether the rejection was due to the customer's credit card having expired. If so, then, at step 155, a determination is made as to whether the customer wants to enter a new expiration date for the same credit card. In particular, in the preferred embodiment, a message to that effect is sent from provider services server 15 to the postage meter 10 where it is displayed to the customer. If the answer at step 155 is yes, then, at step 160, the customer enters the new expiration date into the postage meter 10 using its keyboard or the like, and the information is transmitted to provider services server 15, where it is used to update the customer's records for future transactions. Next, the method returns to step 140 where the steps are taken to determine whether the credit card transaction using the updated information is rejected. If the answer is no, steps are taken a step 145 to refill the postage meter 10 with the requested postage (the customer credit card with the new expiration date will be charged). If the answer is yes (transaction rejected), the method proceeds to step 150 and beyond.

If during the course of the method the answer at either of step 150 or 155 is no, then, at step 165, postage services server 15 determines whether the customer wishes to provide a new credit card with new information for use in the transaction. If the answer is no, then, at step 170, the postage refill request is denied because there is no valid method of payment. If, however, the answer at step 165 is yes, the customer, at step 175, enters the new credit card information into the postage meter 10 using its keyboard or the like and the information is transmitted to provider services server 15, where it is used to update the customer's records for future transactions. Next, the method returns to step 140, where it is determined whether the transaction using the new credit card information is rejected. If not, then, at step 145, steps are taken to refill postage meter 10. If the transaction is again rejected, the method again proceeds to steps 150 through 175 described above.

Thus, the system and method of this aspect of the invention enable a customer to provide new/updated payment method information for postage refills without having to separately telephone the provider. As will be appreciated, this system and method provide added convenience and efficiency for the customer and lessen the customer service burden on the provider.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of collecting a past due payment from a customer associated with a postage meter where the customer has a past due account, comprising:
   receiving a request for a service from said postage meter;
   determining that said customer has the past due account, wherein the past due account does not include a type of charge associated with said requested service;
   requesting through said postage meter that said customer make said past due payment using a credit card and requesting that said customer provide credit card information through said postage meter relating to said credit card for purposes of charging said past due payment to said credit card; and
   performing said service and charging said past due payment to said credit card if said customer provides said credit card information through said postage meter, and denying said service if said customer does not provide said credit card information.

2. The method according to claim 1, wherein said service comprises a postage refill for said postage meter.

3. The method according to claim 1, wherein said service comprises a remote inspection of said postage meter.

4. The method according to claim 1, said method being performed at a data center of a provider of said postage meter, said data center being located remotely from said postage meter.

5. The method according to claim 4, wherein said customer enters said credit card information into said postage meter and said credit card information is transmitted electronically to said data center.

6. The method according to claim 1, said payment comprising payment in full for said past due account.

7. The method according to claim 1, said past due account relating to a rental of said postage meter.

8. The method according to claim 1, said payment comprising partial payment for said past due account.

9. A method of collecting a past due payment from a customer associated with a postage meter where the customer has a past due account, comprising:
   receiving a request for a postage refill transaction from said postage meter;
   determining that said customer has the past due account wherein the past due account does not include postage refill transaction costs;
   requesting through said postage meter that said customer make said past due payment and a postage refill transaction payment using a credit card and requesting that said customer provide credit card information through said postage meter relating to said credit card for purposes of charging said past due payment and said postage refill transaction payment to said credit card; and
   performing said postage refill transaction and charging said past due payment and said postage refill transaction payment to said credit card if said customer provides said credit card information through said postage meter, and denying said postage refill transaction if said customer does not provide said credit card information.

10. The method according to claim 9, said method being performed at a data center of a provider of said postage meter, said data center being located remotely from said postage meter.

11. The method according to claim 10, wherein said customer enters said credit card information into said postage meter and said credit card information is transmitted electronically to said data center.

12. The method according to claim 9, said past due payment comprising payment in full for said past due account.

13. The method according to claim 9, said past due account relating to a rental of said postage meter.

14. The method according to claim 9, said payment comprising partial payment for said past due account.

15. A method of collecting a past due payment from a customer associated with a postage meter where the customer has a past due account, comprising:

receiving a request for a postage refill transaction from said postage meter;

determining that said customer has the past due account wherein the past due account does not include postage refill transaction costs;

determining that said customer has a stored credit card payment record associated with a credit card related to postage refill transactions;

requesting through said postage meter that said customer provide payment authorization to pay said past due payment and a postage refill transaction payment using the stored credit card payment record; and performing said postage refill transaction and charging said past due payment and said postage refill transaction payment to said credit card if said customer provides said payment authorization through said postage meter, and denying said postage refill transaction if said customer does not provide said payment authorization.

16. The method according to claim 15, said method being performed at a data center of a provider of said postage meter, said data center being located remotely from said postage meter.

17. The method according to claim 16, wherein said customer enters said credit card payment authorization into said postage meter.

18. The method according to claim 15, said past due payment comprising payment in full for said past due account.

19. The method according to claim 15, said past due account relating to a rental of said postage meter.

20. The method according to claim 15, said payment comprising partial payment for said past due account.

* * * * *